United States Patent
Rietzler

(10) Patent No.: US 12,254,365 B2
(45) Date of Patent: Mar. 18, 2025

(54) RFID TAG FOR BEING FASTENED TO A TEXTILE

(71) Applicant: Manfred Rietzler, Bangkok (TH)

(72) Inventor: Manfred Rietzler, Bangkok (TH)

( * ) Notice: Subject to any disclaimer, the term of this patent is extended or adjusted under 35 U.S.C. 154(b) by 0 days.

(21) Appl. No.: 18/274,420

(22) PCT Filed: Jan. 19, 2022

(86) PCT No.: PCT/EP2022/051099
§ 371 (c)(1),
(2) Date: Jul. 26, 2023

(87) PCT Pub. No.: WO2022/167221
PCT Pub. Date: Aug. 11, 2022

(65) Prior Publication Data
US 2024/0095481 A1 Mar. 21, 2024

(30) Foreign Application Priority Data
Feb. 2, 2021 (DE) ............. 10 2021 102 349.1

(51) Int. Cl.
*G06K 19/02* (2006.01)
*G06K 19/07* (2006.01)

(52) U.S. Cl.
CPC ....... *G06K 19/027* (2013.01); *G06K 19/0723* (2013.01)

(58) Field of Classification Search
CPC ............. G06K 19/025; G06K 19/027; G06K 19/0723; G06K 19/07749
See application file for complete search history.

(56) References Cited

U.S. PATENT DOCUMENTS

| | | | |
|---|---|---|---|
| 7,580,000 B2 * | 8/2009 | Kai | H01Q 1/2225 |
| | | | 343/730 |
| 9,773,202 B2 * | 9/2017 | Manzi | G06K 19/07756 |
| 2005/0093678 A1 | 5/2005 | Forster et al. | |
| 2007/0001916 A1 | 1/2007 | King et al. | |
| 2013/0265134 A1 | 10/2013 | Gengel et al. | |
| 2019/0171921 A1 | 6/2019 | Forster | |

FOREIGN PATENT DOCUMENTS

| | | |
|---|---|---|
| DE | 102005033196 A1 | 1/2007 |
| EP | 2288743 B1 | 11/2016 |
| JP | 2009054145 A | 3/2009 |
| JP | 2011095844 A | 5/2011 |
| WO | WO0207085 A1 | 1/2002 |

* cited by examiner

*Primary Examiner* — Thien M Le
*Assistant Examiner* — April A Taylor
(74) *Attorney, Agent, or Firm* — Dickinson Wright PLLC; Andrew D. Dorisio

(57) ABSTRACT

The invention relates to an RFID tag (2, 3) for being fastened to a textile (30), the RFID tag (2, 3) having a transponder unit (5), which is attached to a bendable carrier material (4) and has an integrated circuit (6) having a conductor structure (8, 9) electrically connected via contact surfaces (7). The carrier material (4) is designed as a conductor structure (8) having a longitudinal slot (10, 11), which separates the contact surfaces (7) of opposite polarity from each other, the carrier material (4) being strip-shaped and having a length (L)-to-width (W) ratio which is a multiple of ten of the width. Furthermore, the invention relates to a method for fastening the RFID tag (2, 3) to a textile (30).

13 Claims, 5 Drawing Sheets

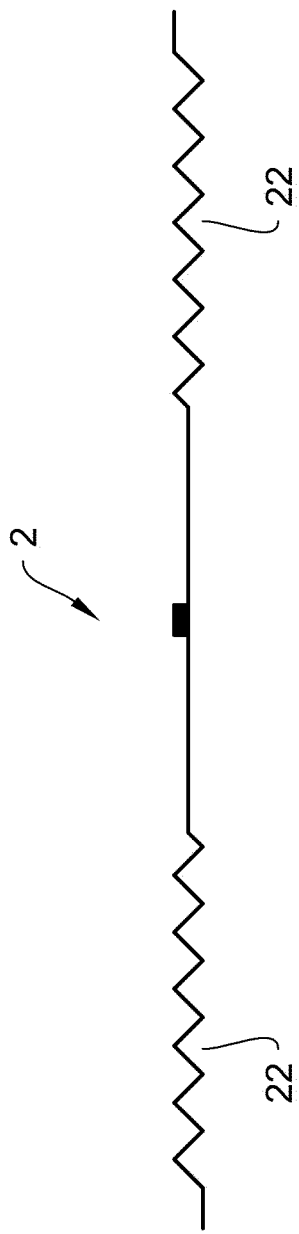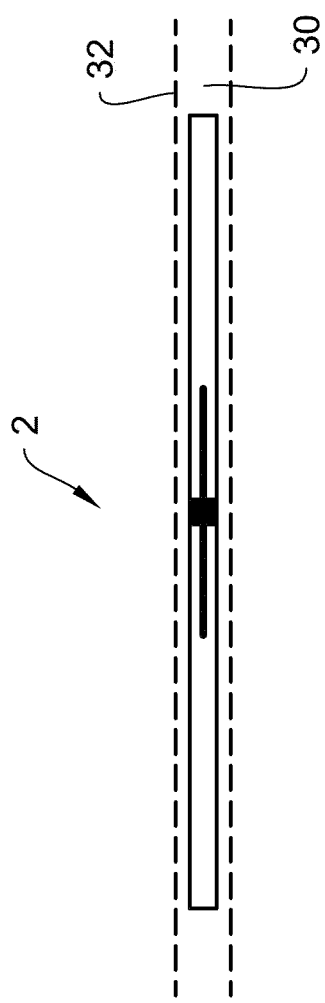

RFID TAG FOR BEING FASTENED TO A TEXTILE

TECHNICAL FIELD

The invention at hand relates to an RFID tag for being fastened to a textile, the RFID tag having a transponder unit, which is attached to a bendable carrier material and has an integrated circuit having a conductor structure electrically connected via contact surfaces.

BACKGROUND

Furthermore, the invention relates to methods for fastening the RFID tag according to the invention to a textile.

RFID tags are used in various application fields for detecting or identifying objects. In particular in conjunction with the identification of textiles, RFID tags are often exposed to high mechanical stress and demand an invisible and impalpable integration in the textile. Especially for clothing articles, an integration of the RFID tag which does not impair the wearing comfort is expected. In addition, a reliable data transfer between the RFID tag and a reading device must be ensured at all times.

The object of the invention at hand is therefore to integrate an RFID tag in a nearly invisible and impalpable manner in the textile while taking the particular mechanical stress into consideration.

SUMMARY

This object is attained by the carrier material having a conductor structure having a longitudinal slot which separates the contact surfaces of opposite polarity from each other, the carrier material being strip-shaped and having a length-to-width ratio which is a multiple of ten of the width, i.e., preferably greater than 20, the thickness of the carrier material preferably being smaller than its width. The resulting particularly slim design of the carrier material leads to a minimization of the rigidity distinct in the film plane in a typically flat film, i.e. essentially no bending stiffness is present transverse to the longitudinal axis of the carrier material independently of the stress direction and the firmness of the carrier material is essentially determined by the tensile strength.

Due to the inhomogeneity of textile textures present in particular in clothing articles, the limited application surfaces and the resulting limited fastening options, the conductor structure (antenna geometry) cannot be sized in any desired manner.

The fundamental idea of the invention at hand thus consists of forming the carrier material in a strip shape and making it extremely slim. Thus, the RFID tag can be easily bent in its longitudinal axis, without appearing rigid or impairing. The RFID tag according to the invention consequently possesses a much larger expansion in the longitudinal direction in comparison to commercially available RFID tags, while, however, being dimensioned so small in its width and height that it can no longer be felt in the textile and does not introduce any bending stiffness in the textile, i.e., can no longer be felt upon touch.

For the metallized carrier material to unfurl the effect of a dipole antenna in its function as a conductor structure, the conductor structure has a longitudinal slot, which determines the distance of the antenna dipole extending in the longitudinal direction of the carrier material and separates the contact surfaces of opposite polarity from each other in order to tap the potential difference (electric voltage) of the thus generated dipole antenna (folded dipole) and to transfer it to the integrated circuit (chip). For this purpose, the length and the width of the longitudinal slot primarily determine the resonance frequency of the RFID tag.

Preferably, the carrier material is provided with a longitudinal reinforcement, which can be made from the carrier material itself or as an addition to the carrier material, in particular as a longitudinal thread extending in the longitudinal direction of the carrier material and being connected to the carrier material or a longitudinal fiber. For instance, the carrier material can be designed as a fiber reinforced material.

Consequently, a high tear strength is ensured at a low bending stiffness, meaning the RFID tag can also be integrated in elastic textiles without being noticeable.

Preferably, the length-to-width ratio is greater than 20, preferably greater than 50 and particularly preferably greater than 100.

Preferably, the longitudinal slot is T-shaped, the long T-leg extending in the longitudinal direction of the carrier material determining the distance of the antenna dipole extending in the longitudinal direction of the carrier material, whereas the short T-leg separates the contact surfaces of opposite polarity from each other in order to tap the potential difference (electric voltage) of the dipole antenna (folded dipole) and to transfer it to the integrated circuit (chip).

In conjunction with the invention at hand, the term slot is to be understood such that the slot allows forming the conductor structure, i.e. the slot is provided in the material forming the conductor structure and does not have to be formed additionally in the carrier material.

Preferably, the carrier material is designed as a film material equipped with a metallization designed in particular as a surface metallization.

Preferably, the carrier material is designed as a PET film having an aluminum metallization.

This design allows a high mechanical strength while simultaneously ensuring good electric (antenna) properties and a cost-efficient production.

In an alternative embodiment, the carrier material is made of an elastic material.

The material can be chosen such that the carrier material of the RFID tag has a sufficient elasticity. In this context, however, it is to be borne in mind that the area of the integrated circuit (chip area) is kept free of stress. The elastic carrier material can be a material free of plastic.

Further, the carrier material can be pre-folded at the end areas.

In order to be able to cause a mechanical uncoupling from the pre-formable textile and to counteract a—including creeping—stretching of the textile, the (dipole) end areas are slightly pre-folded.

Furthermore, the end sections of the RFID tag have specific round or specific angular contours for adjusting the transmission band width.

For this purpose, the end sections of the RFID tag have single or multiple round or angular edges, for example zigzagged edges or edges cut at an incline, adjusted specifically to the transmission band width.

The object of the invention at hand is further attained by a method for fastening the RFID tag according to the invention, the RFID tag being fastened precisely in one position.

The RFID tag is fastened in merely one area, preferably in the central area where the electric circuit (chip) is disposed, the area being small with respect to the longitudinal extension of the RFID tag. The two legs of the carrier material, which form the dipole legs of the conductor structure, are not connected to the textile and remain movably integrated in the textile, for example only loosely inserted in the hem.

Preferably, the precise fastening takes place via sewing or adhesive bonding.

With regard to production, the precise fastening takes place in a simple, reliable and cost-efficient manner via sewing or adhesive bonding.

In an alternative method for fastening the RFID tag according to the invention, the RFID tag is float-fastened via sewing across it, the RFID tag being disposed between the punctures of a sewing thread in the textile.

The RFID tag is consequently movably stored in the textile, surrounded by the sewing thread in the manner of a tunnel, meaning only slight forces, in particular no tensile forces in the longitudinal direction, are transferred to the RFID tag.

In both fastening methods mentioned above, a reinforcing seam can be threaded additionally in a fastening area of the RFID tag in the textile along a longitudinal axis of the RFID tag.

The reinforcing seam prevents the textile from stretching in the area of the RFID tag and thus presents another simple and effective measure for protecting the RFID tag when fastened.

BRIEF DESCRIPTION OF THE DRAWINGS

Further advantageous design features are derived from the following description and the drawings, which both describe preferred embodiments of the invention in further detail by means of examples.

FIG. 3 shows an embodiment having pre-folded end areas;

FIG. 4 shows a fastening with an additional reinforcing seam in the textile;

DETAILED DESCRIPTION

Figure 1:
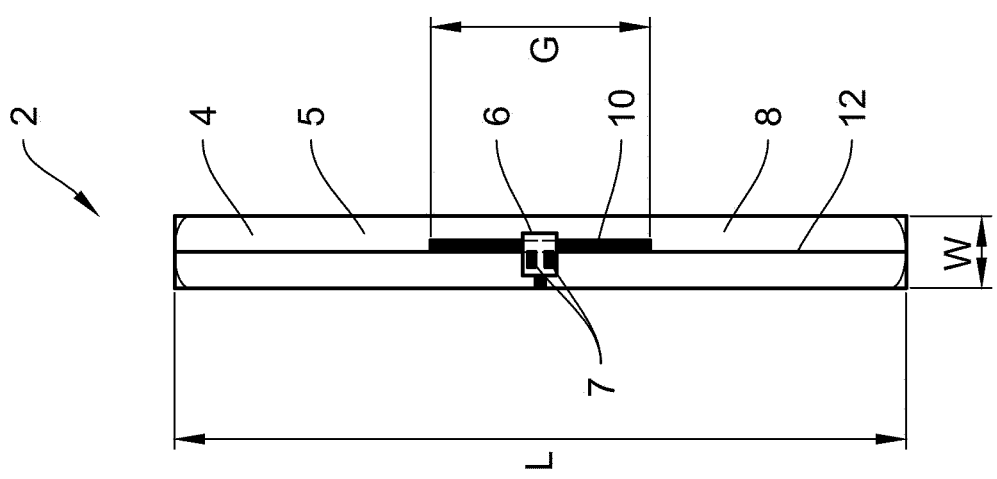
FIG. 1 shows a preferred embodiment of an RFID tag according to the invention.

FIG. 1 shows an RFID tag 2 according to the invention having a transponder unit 5, which is attached to a bendable carrier material 4. Transponder unit 5 consists of an integrated circuit 6 (chip) and a conductor structure 8 (antenna) connected to integrated circuit 6 by means of contact surfaces 7.

Preferably, carrier material 4 is made of a thin PET film having an aluminum metallization and thus forms a conductor structure 8. A T-shaped longitudinal slot 10 allows electrically conductive carrier material 4 to act as a dipole antenna (folded dipole), contact surfaces 7 being separated in their polarity by integrated circuit 6 via T-shaped slot 10 in order to tap the voltage at the dipole ends. Resonance-determining length G of the longitudinal slot is preferably present in a range from 30 mm to 50 mm.

The size ratio length L to width W of carrier material 4 is preferably greater than 50, whereby a nearly thread-shaped RFID tag 2, which is extremely slim in its dimension, is formed. For instance, RFID tag 2 is designed having a length L=134 mm and a width W=0.5 mm to 2 mm.

In this context, the arrangements shown in the figures are schematic illustrations, which are not true to scale.

Figure 2:
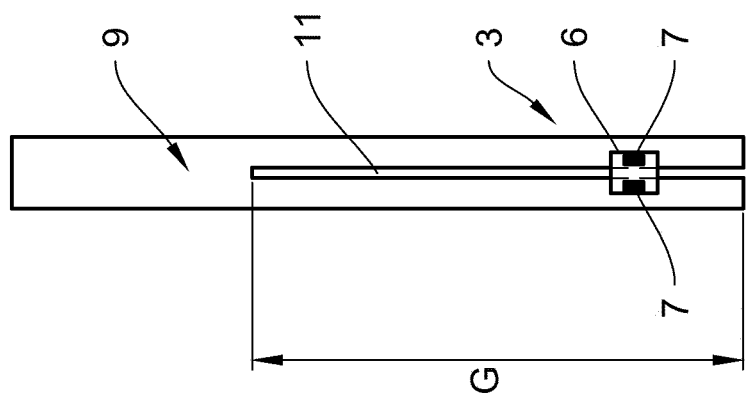
FIG. 2 shows another embodiment.

In another embodiment, FIG. 2 shows an RFID tag 3 which has a longitudinal slot 11 for forming a conductor structure 9, longitudinal slot 11 both determining the distance of the antenna dipole extending in the longitudinal direction of the carrier material and separating contact surfaces 7 of opposite polarity from each other in order to tap the potential difference of the thus formed dipole antenna and to transfer it to integrated circuit 6.

FIG. 3 shows an RFID tag 2 which is pre-folded at its end areas 22. Slightly pre-folded end areas 22 reduce the tensile force on the central area of RFID tag 2 equipped with the chip and counteract a (creeping) stretching of textile 30.

FIG. 4 shows a fastening of RFID tag 2 on textile 30. To increase and reduce forces acting on RFID tag 2, textile 30 is equipped with a reinforcing seam 32 in the area of RFID tag 2.

Figure 5:
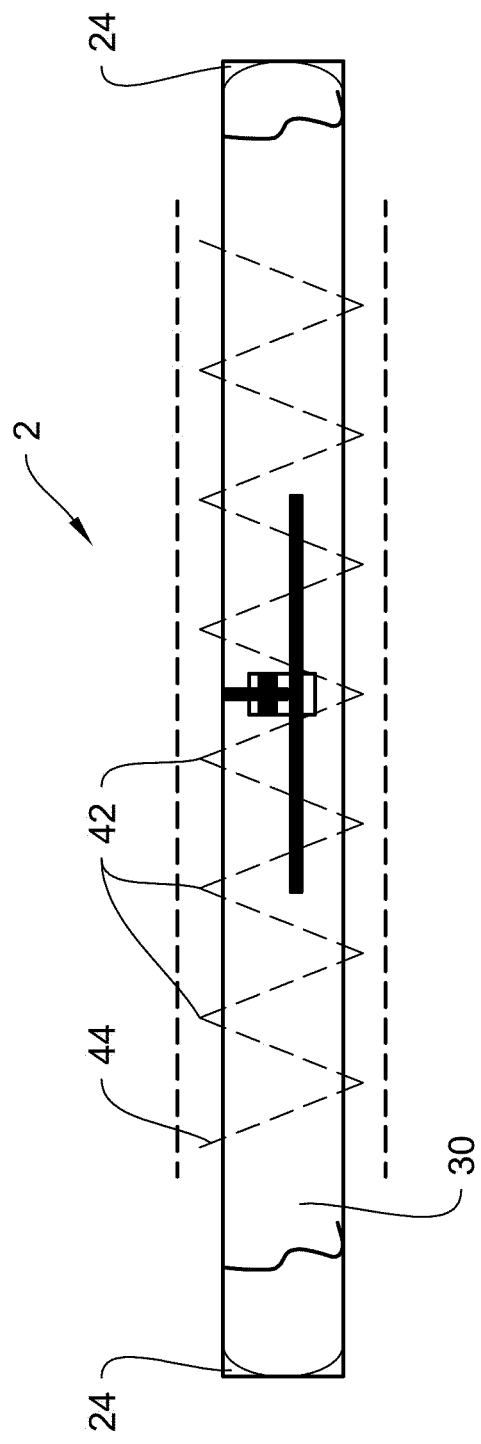
FIG. 5 shows a fastening via sewing.

FIG. 5 shows a fastening of RFID tag 2 via sewing across it using a sewing thread 44. In this context, punctures 42 of sewing thread 44 are disposed lengthwise outside of RFID tag 2, meaning RFID tag 2 is float-fastened between punctures 42.

The end sections of RFID tag 2 have specific round or specific angular contours 24 for adjusting the transmission band width.

Figure 6:
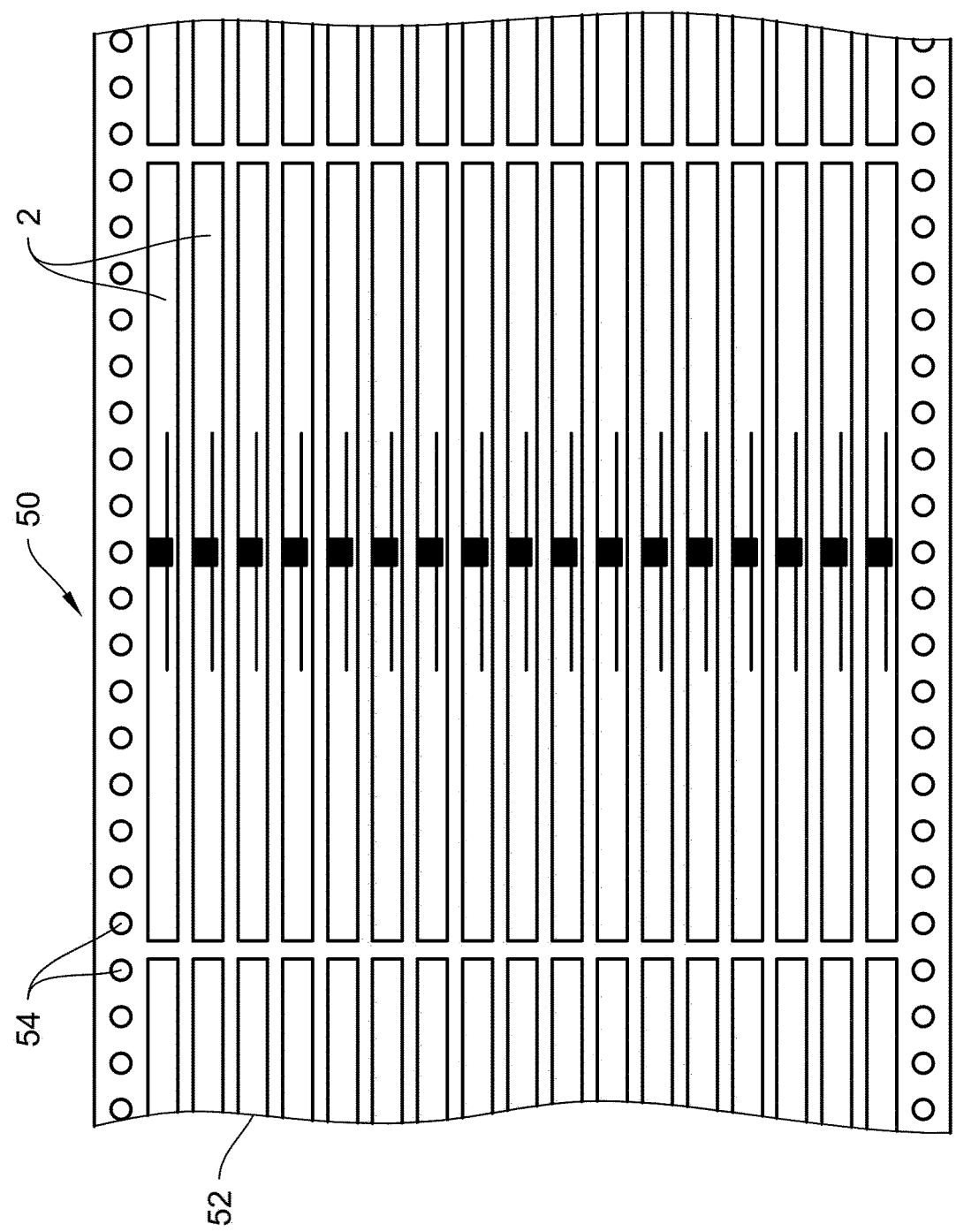
FIG. 6 shows a transport arrangement during production.

FIG. 6 shows a transport arrangement 50, in which RFID tags 2 are disposed on a transport film 52 having transport holes 54 in the longitudinal direction. The longitudinal position has the advantage of the aluminum as a component of carrier material 4 being applied in the running direction to RFID tag 2 and thus being more resilient upon tensile stress, which in turn proves advantageous with regard to the tear strength upon stretching.

Figure 7:
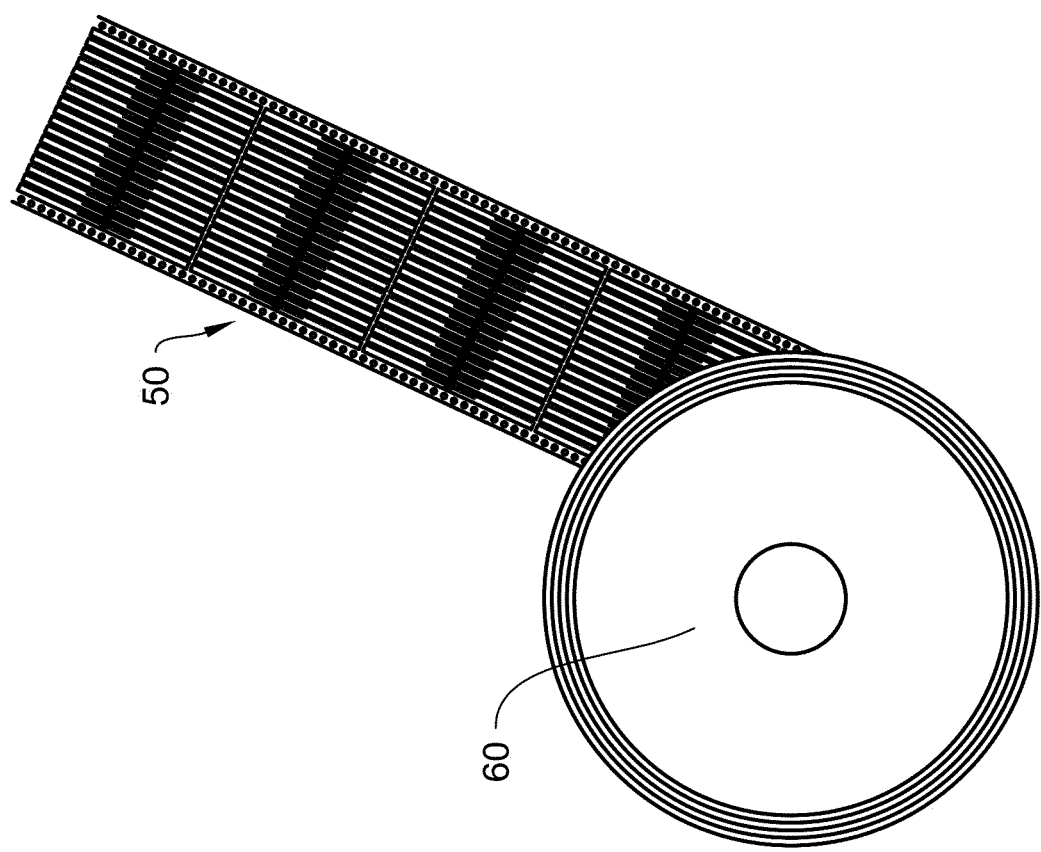
FIG. 7 shows the transport arrangement according to FIG. 5 having a transport roll.

FIG. 7 schematically shows, for clarification, transport arrangement 50 when unwound from transport roll 60.

The roll format is a sensible solution for production in large numbers and is suitable in particular for supplying RFID tag 2 during the textile production.

Figure 8:
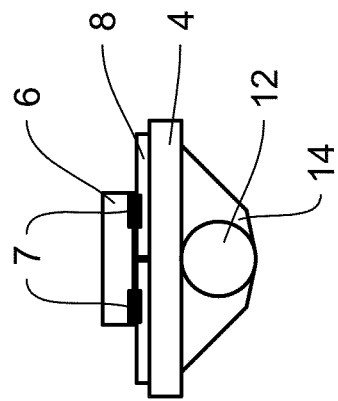
FIG. 8 shows the transport arrangement according to FIG. 5 having a carrier thread.

FIG. 8 shows in what manner a carrier thread can be attached additionally on the reverse side of carrier material 4 of RFID tag 2 as a longitudinal reinforcement 12 with the aid of transport roll 60 during the previously mentioned production. In this context, carrier thread 12 is generously bound in an adhesive bed 14.

The invention claimed is:

1. A radio frequency identification (RFID) tag (2, 3) for being fastened to a textile (30), the RFID tag (2, 3) having a transponder unit (5), which is attached to a bendable carrier material (4) and has an integrated circuit (6) having a conductor structure (8, 9) electrically connected via contact surfaces (7), characterized in that the carrier material (4) has the conductor structure (8) and a longitudinal slot (10, 11), which is a T-shaped slot and wherein a long T-leg extending in a longitudinal direction of the carrier material (4) determines a distance of an antenna dipole extending in the longitudinal direction of the carrier material (4), whereas a short T-leg separates the contact surfaces (7) of opposite polarity from each other, the carrier material (4) being strip-shaped and having a length (L)-to-width (W) ratio which is a multiple of ten of the width.

2. The RFID tag (2, 3) according to claim 1, characterized in that the length-to-width ratio is greater than 20.

3. The RFID tag (2, 3) according to claim 1, characterized in that the length-to-width ratio is greater than 50.

4. The RFID tag (2, 3) according to claim 1, characterized in that the length-to-width ratio is greater than 100.

5. The RFID tag (2, 3) according to claim 1, characterized in that the thickness of the carrier material is less than the carrier material width.

6. The RFID tag (2, 3) according claim 1, characterized in that the carrier material is equipped with a longitudinal reinforcement.

7. The RFID tag (2, 3) according to claim 1, characterized in that the carrier material is designed as a PET film having an aluminum metallization.

8. The RFID tag (2, 3) according to claim 1, characterized in that the carrier material (4) is made of an elastic material.

9. The RFID tag (2) according to claim 1, characterized in that the carrier material (4) is pre-folded at end areas (22).

10. The RFID tag (2, 3) according to claim 1, characterized in that end sections of the RFID tag (2) have specific round or specific angular contours (24) for adjusting a transmission band width.

11. A method for fastening a radio frequency identification (RFID) tag (2, 3) to a textile (30) comprising:

providing the RFID tag, said RFID tag having a transponder unit (5), which is attached to a bendable carrier material (4) and having an integrated circuit (6) having a conductor structure (8, 9) electrically connected via contact surfaces (7), wherein the carrier material (4) has the conductor structure (8) and a longitudinal slot (10, 11), which is a T-shaped slot and wherein a long T-leg extending in a longitudinal direction of the carrier material (4) determines a distance of an antenna dipole extending in the longitudinal direction of the carrier material (4), whereas a short T-leg separates the contact surfaces (7) of opposite polarity from each other, the carrier material (4) being strip-shaped and having a length (L)-to-width (W) ratio which is a multiple of ten of the width; and fastening the RFID tag (2) precisely in one position.

12. The method according to claim 11, characterized in that the precise fastening takes place via sewing or adhesive bonding.

13. The method for fastening the RFID tag (2, 3) according to claim 11 to the textile (30), characterized in that the RFID tag (2) is float-fastened via sewing across the RFID tag, the RFID tag (2) being disposed between punctures (42) of a sewing thread (44) in the textile (30).

* * * * *